United States Patent [19]

Tsukada

[11] Patent Number: 5,220,249
[45] Date of Patent: Jun. 15, 1993

[54] FLAT TYPE FLUORESCENT LAMP AND METHOD OF LIGHTING

[75] Inventor: Yoshiyuki Tsukada, Shiga, Japan
[73] Assignee: NEC Corporation, Tokyo, Japan
[21] Appl. No.: 772,865
[22] Filed: Oct. 8, 1991
[30] Foreign Application Priority Data
Oct. 8, 1990 [JP] Japan .................. 2-271018
Apr. 12, 1991 [JP] Japan .................. 3-108502
[51] Int. Cl.[5] ........................... H05B 41/16
[52] U.S. Cl. ........................ 315/246; 315/169.3; 315/169.4; 315/DIG. 1; 313/493; 313/634
[58] Field of Search .......... 315/246, DIG. 1, 169.3, 315/169.4; 313/493, 634

[56] References Cited

U.S. PATENT DOCUMENTS

| | | | |
|---|---|---|---|
| 2,265,323 | 12/1941 | Spanner | 315/DIG. 1 |
| 3,594,610 | 7/1971 | Evans et al. | 315/169.3 |
| 4,584,501 | 4/1986 | Cocks et al. | 313/493 |
| 4,751,434 | 6/1988 | Helling et al. | 315/DIG. 7 |
| 5,041,762 | 8/1991 | Hartai | 313/634 |

Primary Examiner—Robert J. Pascal
Assistant Examiner—R. A. Ratliff
Attorney, Agent, or Firm—Leydig, Voit & Mayer

[57] ABSTRACT

A flat type fluorescent lamp device is constituted by two transparent glass plates assembled and sealed together thereby forming a glass plate assembly, a discharge channel formed in a serpentine form by a groove on at least one of the two transparent glass plates with the inner surface of the groove carrying a fluorescent film. A pair of electrodes are provided, electrode each at each end of the discharge channel, a light diffuser provided on the front surface of the glass plate assembly and a light reflector is provided at the back surface of the glass plate assembly. In one aspect of the invention, at least another electrode is provided between the two electrodes thereby dividing the discharge channel into a plurality of individual discharge channels, in which case it is possible to ensure that all of the individual channels have the same electric characteristics and can be caused to be lit in parallel by a single power source. The device is light and compact and has uniform luminosity distribution, so that the device is suitable for use in liquid crystal display panels.

9 Claims, 8 Drawing Sheets

PRODUCTION YIELD IN EXHAUST PROCESSING AFTER FLITCH SEALING (NO. OF SAMPLES: 16)

GAP BETWEEN FRONT AND BACK GLASS PLATES (mm)

FLAT TYPE FLUORESCENT LAMP AND METHOD OF LIGHTING

BACKGROUND OF THE INVENTION

1. Field of the Invention

The present invention relates to a backlighting lamp and a method of lighting and, more particularly, to a backlighting lamp and a method of backlighting for use in liquid crystal display panels.

2. Description of the prior art

As a light source for a backlighting device in liquid crystal display panels used in such devices as a LCD television, it is conventional to use an electroluminescence (EL) or a fluorescent lamp. An advantage of the electroluminescence is that a luminous body can be made flat and thin and its light distribution made uniform. However, the electroluminescent involves technical problems such as a lack of luminous intensity or inability to produce a desired white light and is generally regarded as unsuitable for use in the backlighting for liquid crystal display panels. Thus, the backlighting device which utilizes as its light source a fluorescent lamp of a straight pipe type or a U-shaped pipe type and in which luminous brightness is higher than that in the electroluminescent, has been used in many practical applications.

Examples of such conventional backlighting devices are shown in FIGS. 1 and 2. The numeral 1 represents a housing 1 whose inner surface is a reflective surface, 2 represents a straight pipe type fluorescent lamp which extends through the housing 1, and 3 represents a diffuse plate which closes an upper opening of the housing 1. When the fluorescent lamp 2 is lit, the light is diffused and transmitted through the diffuse plate 3 and the liquid crystal display panel 4 on the diffuse plate 3 is illuminated. Since the reflective surface of the housing 1 is curved and the diffuse plate is present, the panel 4 is illuminated with fairly sufficient uniform light distribution.

As another backlighting device, there has been proposed a flat type electroluminescent lamp as shown in FIGS. 3 and 4. This is constituted by a fluorescent film 6 formed on an inner surface of a rectangular plate type housing 5, a pair of electrodes 7, 7 provided at opposite two inside ends of the housing 5, and a transparent glass plate 8 airtightly closing the upper opening of the housing 5. The electrodes 7, 7 are led out by external leads 9, 9 from both ends of the housing 5. Inert gas and mercury-vapor are enclosed in a sealed space formed by the glass plate 8 and the housing 5. The pair of electrodes 7, 7 are of either a cold cathode type or a thermal cathode type and extend transversely of the housing 5. When a voltage is applied to the pair of electrodes 7, 7, a flat glow discharging develops extending transversely of and within the housing 5 thereby causing the fluorescent film 6 to glow. The liquid crystal display panel 4 on the glass plate 8 is illuminated with the light being radiated externally from the glass plate 8 with fairly sufficient light distribution.

Next, a conventional method of backlighting is explained. As shown in FIG. 5, in the backlighting device, a straight pipe type fluorescent lamp 2 extends through the housing 1 whose inner surface is a reflective surface and the upper opening of the housing 1 is airtightly closed by the diffuse plate 3. The fluorescent lamp 2 is lit when a high frequency voltage is applied to its electrodes from the power source 10.

The backlighting device shown in FIGS. 6 and 7 is of the type in which a plurality of straight pipe type fluorescent lamps 2, 2 are used. In this arrangement, a plurality of fluorescent lamps 2, 2 disposed in parallel are connected to one power source 10 and a stabilizer 11 is provided to each of the fluorescent lamps 2, 2.

The backlighting device shown in FIG. 8 is constituted by a fluorescent film formed on the inner surface of the housing 12, a pair of electrodes 12 disposed at opposite inside ends of the housing 12, and a transparent glass plate 14 airtightly closing the upper opening of the housing 12. Inert gas and mercury are filled in the sealed space formed by the housing 12 and the glass plate 14. In this backlighting device, when a high frequency voltage is applied from the power source 10 to the pair electrodes 13, 13 at both the ends of the housing 12, a flat glow discharge develops extending transversely or widthwise of the housing 12 so that the fluorescent film glows. This resultant light is radiated externally from the glass plate 14 and the liquid crystal display panel on the glass 14 is illuminated.

In the backlighting device described above and shown in FIGS. 1 and 2, since the housing 1 is provided with a curved reflective surface and the diffuse plate 3 is required, the overall structure inevitably becomes thick and heavy thereby making it difficult to meet the demand for a lighter and more compact backlighting device adapted to be used in such as a portable television having a liquid crystal display. Moreover, the curving of the reflective surface, through which it is possible to obtain comparatively uniform light distribution, involves the difficult technology which presents limitations in the designing of backlighting devices.

On the other hand, in the backlighting device shown in FIGS. 3 and 4, although it does not require either the reflective plate or the diffuse plate, the sealed space formed by the housing 5 and the glass plate 8 contains the inert gas and mercury almost or substantially in a vacuum state, so that the glass plate 8 and the housing 5 which are exposed to atmospheric pressure must inevitably be thick enough resulting in the overall structure becoming heavy and presenting difficulties in meeting the need for making the backlighting device light and compact. It may be attempted to provide some supporting members at appropriate points within the sealed space between the housing 5 and the glass plate 8 in which case it may be possible to make the glass place 8 and the housing 8 thinner to some extent. However, the problem in such attempt is that, because of the presence of the supporting members, the luminosity deteriorates and the light cannot be distributed uniformly.

In the backlighting devices shown in FIGS. 6 and 7, one advantage is that, because there are a plurality of fluorescent lamps, it is possible to obtain the light distribution more uniformly than in the backlighting device shown in FIG. 5. However, a problem therein is that, where a single light source 10 is to be used for lighting up the plurality of fluorescent lamps, each of such lamps must have an independent stabilizer, which adds to manufacturing costs and results in the need for an increase in the size and weight of the device. A further problem is that the individual fluorescent lamps each have different electric characteristics because of variations such as in the length of the discharge channel, the diameter thereof and the pressure of the gas contained therein. The unbalanced characteristics in the individual fluorescent lamps result in differences or non-uniformity of lighting and in difficulties in obtaining the necessary uniform light distribution.

Also, in the backlighting device having a fluorescent lamp shaped in "U" or "W" in its cross section, there is an advantage for the device to have more uniform light distribution and to be more compact and lighter than in each of the above described backlighting devices. However, since the device with the "U" or "W" shaped lamp has a discharge channel in a serpentine form, the distance between two electrodes is long and this is especially required to be larger for more uniform light distribution and large display areas. The larger distance requires a higher discharge starting voltage which results in a shorter lifetime of the device and in a higher cost for the provision of the necessary drive circuitry.

SUMMARY OF THE INVENTION

The present invention, therefore, aims at overcoming the above mentioned problems and providing a flat type fluorescent back lighting device which is light and compact and with which it is possible to obtain uniform light distribution by using a single light source and without the need of raising a discharge starting voltage.

According to one aspect of the present invention, there is provided a flat type fluorescent lamp device which comprises:

a pair of transparent glass plates assembled and sealed together thereby forming a glass plate assembly;

a groove formed on a facing surface of at least one of the transparent glass plates;

a discharge channel formed, in a serpentine form, by the groove having on its inner surface a fluorescent film;

a pair of electrode leads provided at both ends of the discharge channel;

a uniform light distribution means provided on a luminous front side surface of the glass plate assembly; and a light reflecting means provided on a non-luminous back side surface of the glass plate assembly.

In the flat type fluorescent lamp lighting device according to the present invention, a voltage is applied between a pair of electrode leads and the discharge develops within the serpentine channel formed in a groove form between the two transparent glass plates thereby causing the fluorescent film to glow. A part of the light is caused to be reflected by reflecting means at the non-luminous back surface of the glass plate assembly and transmitted through a uniform transmission means (mask) at the luminous front side surface of glass plate assembly so that the light radiates outwardly in uniform distribution from the front side surface of the transparent glass assembly. Since the flat type fluorescent lamp lighting device is constructed by two flat transparent glass plates placed one over the other and sealed together, the device can be both thin and light even after the uniform transmission means and the light reflecting means have been added to the transparent glass plates.

Also, in another aspect of the invention, at least one additional electrode lead is provided between the two electrode leads thereby dividing the discharge channel into a plurality of individual discharge channels. In this way, the lamp can be lit without the need of raising the discharge starting voltage and, moreover, since the electric characteristics throughout the individual discharge channels are in the same electric characteristics, all of the individual lamps can be caused to be lit by a single power source and simultaneously at the same level resulting in uniform light distribution. That is, when the individual discharge channels are lit by the single light source and simultaneously at the same level, the electric characteristics of all of the channels can be regarded as equivalent in values.

The present invention also provides a method of lighting in which, out of a plurality of electrodes including the two electrodes at both the ends of the discharge channel, odd numbered electrodes are connected together, and even numbered electrodes are connected together, and then the odd numbered electrodes and the even numbered electrodes receive between them a high frequency voltage from a single power supply source. This makes it possible for all of the individual discharge channels to be lit in parallel through a single power source and contributes in simplifying the drive circuitry.

BRIEF DESCRIPTION OF THE DRAWINGS

The above and other objects, features and advantages of the present invention will be apparent from the following description of preferred embodiments of the invention, with reference to the accompanying drawings, in which.

PREFERRED EMBODIMENTS OF THE INVENTION

Now, an explanation is made on some embodiments of the invention in which the flat fluorescent lamp lighting device according to the invention is used for the back-lighting of liquid crystal display panels, with reference to FIGS. 9 to 17.

Figure 1:
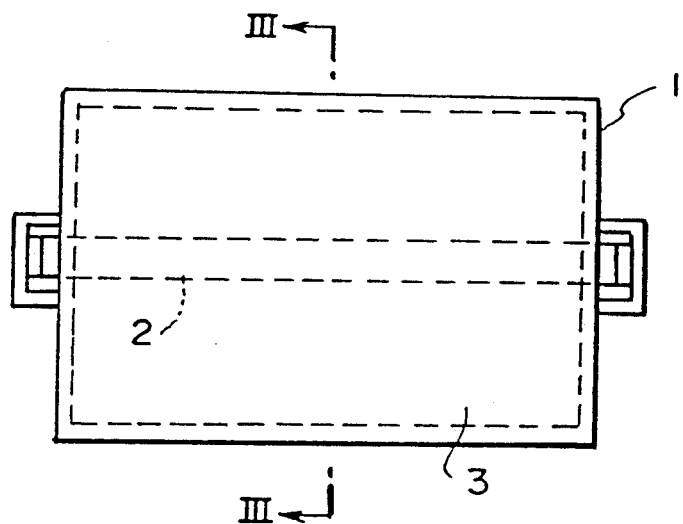
FIG. 1 is a plan view showing a conventional flat type fluorescent lamp lighting device in which a single straight type fluorescent lamp is used.
Figure 2:
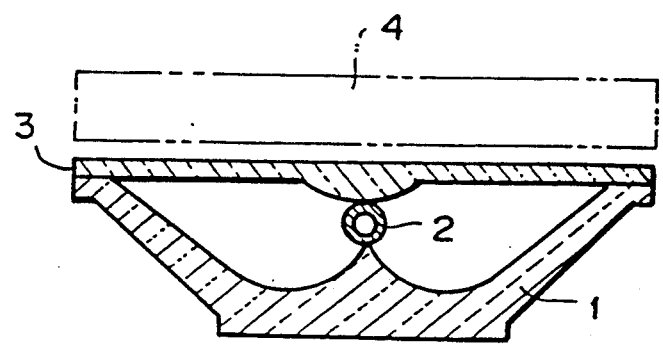
FIG. 2 is a sectional view showing the device in cross section along the line III—III of FIG. 1.
Figure 3:
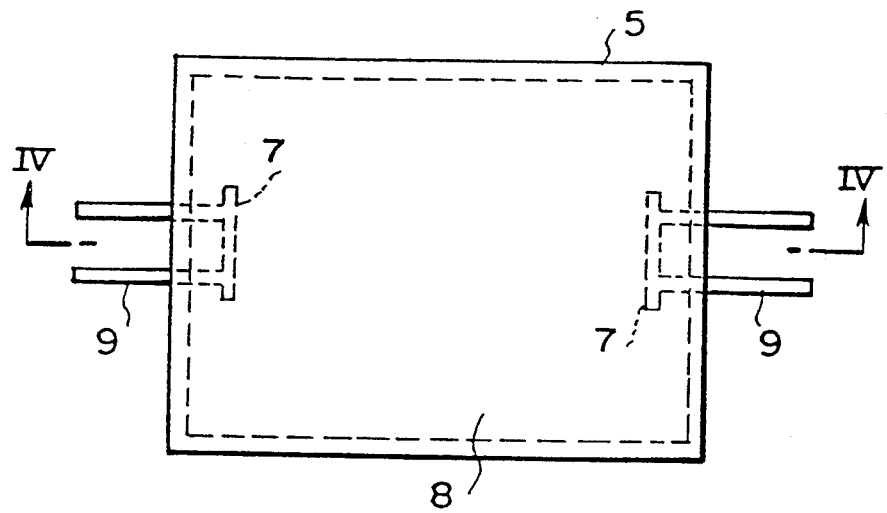
FIG. 3 is a plan view showing another conventional flat type fluorescent lamp lighting device.
Figure 4:
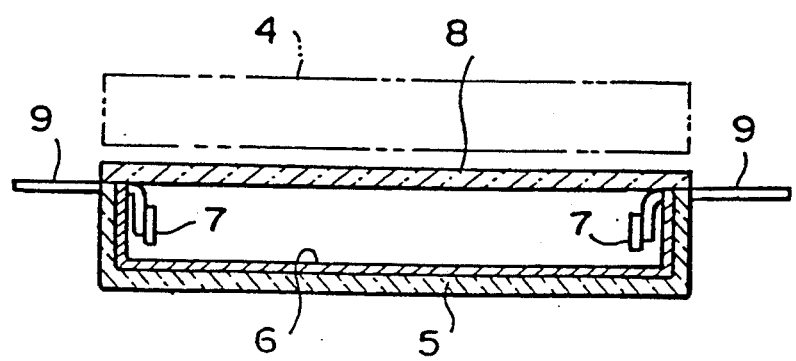
FIG. 4 is a sectional view showing the device in cross section along the line IV—IV of FIG. 3.
Figure 5:
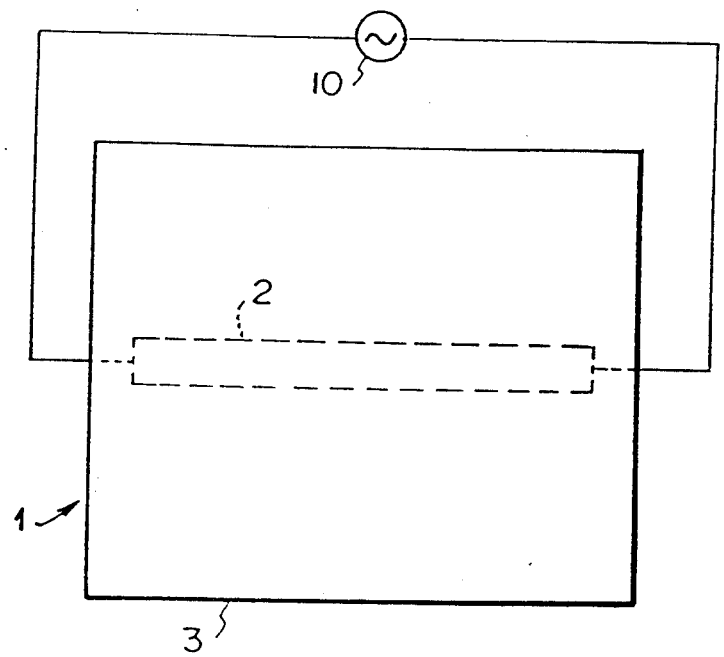
FIG. 5 is a plan view, for explaining a method of lighting, showing a conventional flat type fluorescent lamp lighting device in which a single straight type fluorescent lamp is used.
Figure 6:
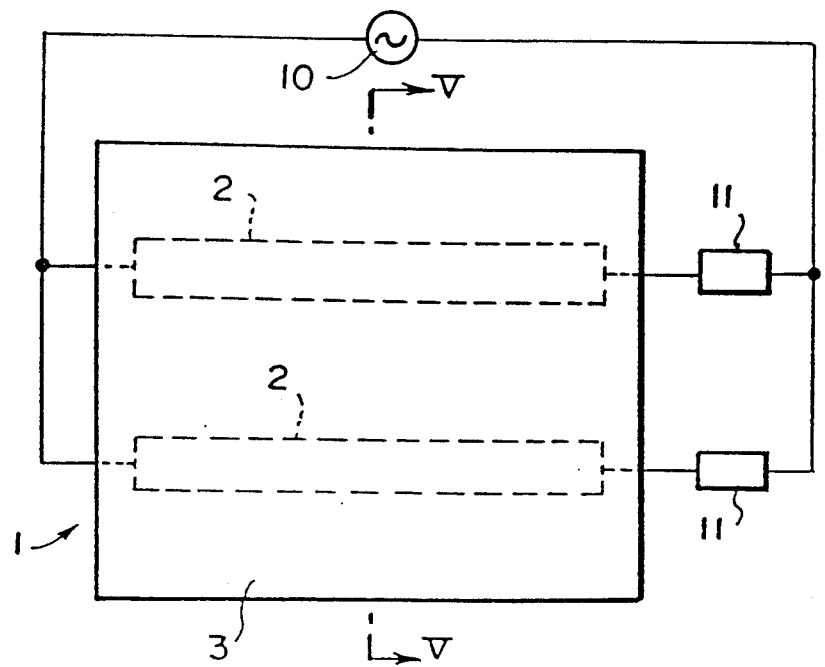
FIG. 6 is a plan view showing a conventional flat type fluorescent lamp lighting device in which a single straight type fluorescent lamp is used and a conventional method of lighting.
Figure 7:
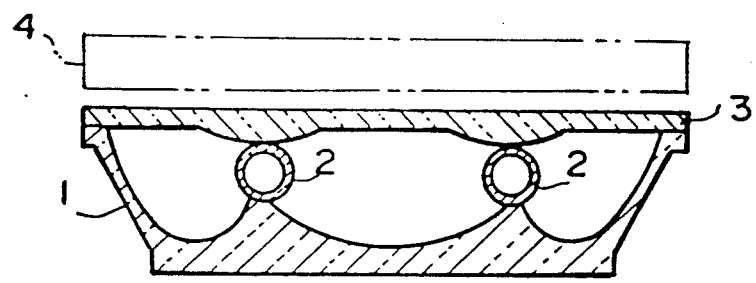
FIG. 7 is a sectional view of the device in section along the line V—V of FIG. 6.
Figure 8:
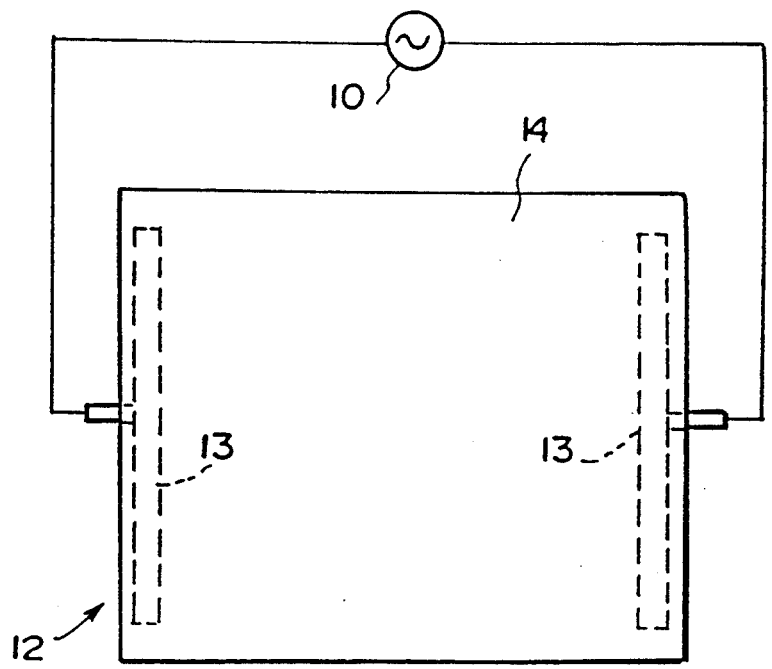
FIG. 8 is a plan view showing a conventional flat type fluorescent lamp lighting device in which the discharge channel is made flat and a conventional method of lighting.
Figure 9:
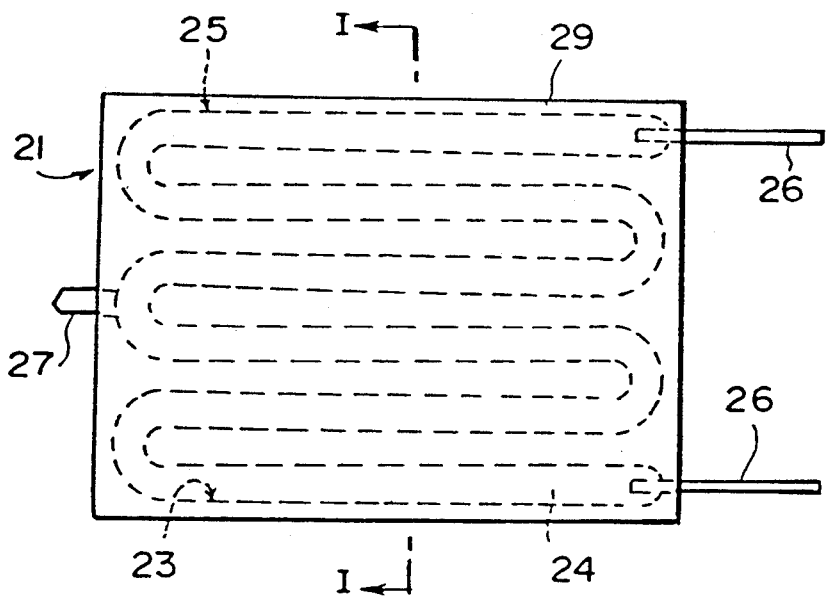
FIG. 9 is a plan view showing a flat type fluorescent lamp lighting device of a first embodiment according to the invention.
Figure 10:
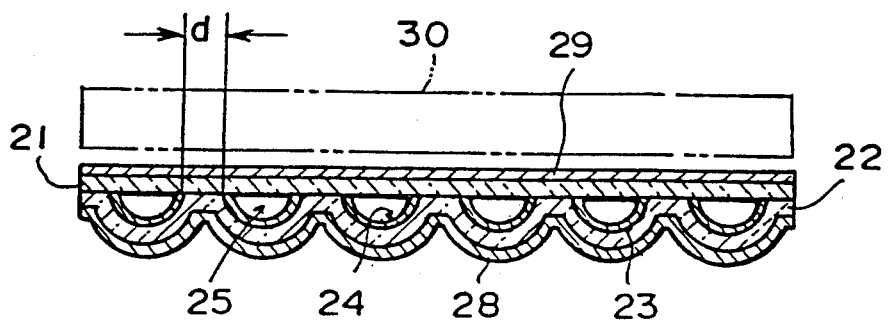
FIG. 10 is a sectional view showing the device of the first embodiment in section along the line I—I of FIG. 9.
Figure 11:
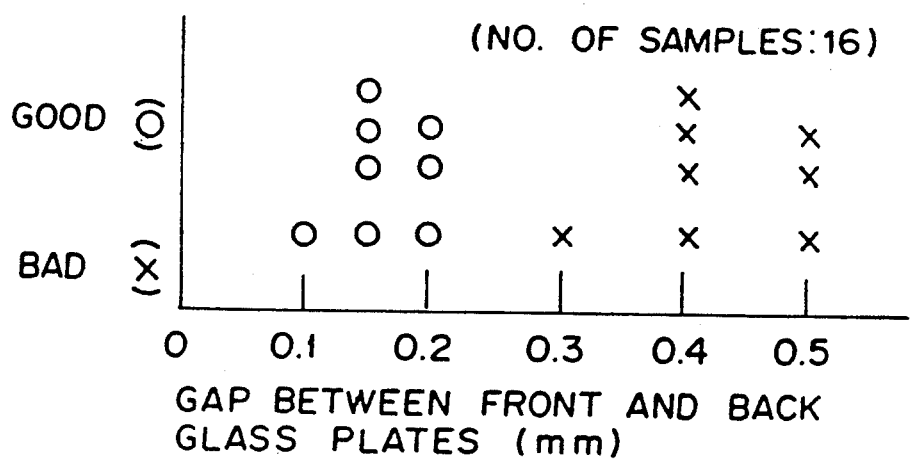
FIG. 11 is a graph showing the relationship between the gap between the two transparent glass plates and the breakage of the glass plates in the course of air exhausting process.

In the flat type fluorescent lamp lighting device of a first embodiment shown in FIGS. 9 and 10, the numerals 21 and 22 represent two transparent glass plates assembled and sealed by solder glass at the periphery thereof. The transparent glass plate 22 has a groove 23 formed by means of a forming process at its facing surface against the glass plate 21. On the inner surface of the groove 23 is provided with a fluorescent film 24. The groove 23 forms a discharge channel 25 in a serpentine form extending over substantially the entire surface area of the transparent glass plate 21. This discharge channel 25 which is sealed is filled with mercury-vapor (Hg) and an inert gas such as argon (Ar). Both the ends of the discharge channel 25 have electrode leads as a pair 26, 26, one electrode lead provided at each end, which may either be of cold cathode type or thermal cathode type. An exhaust pipe 27 extending out from a part of the discharge channel is one whose tip is cut off after the completion of the processes of exhausting the air and filling-in the gas. A reflecting layer 28 is formed by a film of metal, metallic oxide or resin which is coated or vapor-deposited on the non-luminous back side surface of the transparent glass plate 22. A light transmission uniformity means in the form of a mask 29 is also formed by a film of metal, metallic oxide or resin which is coated or vapor-deposited on the luminous side surface of the transparent glass plate 21. The thickness or the area of the mask may partially be varied for the brightness distribution to be uniform at the luminous surface of the transparent glass plate 21. The reflecting layer 28 and the mask 29 are formed directly or integrally on the transparent glass plates 22 and 21, respectively, but it can be arranged that, instead of the reflecting layer 28 and the mask 29, a defuse plate or a reflecting plate may separately be placed one at the front side of the transparent glass plate 21 and the other at the back side of the transparent glass plate 22. As to the serpentine discharge channel 25, it is evident that larger the number of turns in the serpentine form, the better will be the uniformity in the brightness distribution. However, the longer the length of the discharge channel 25, the higher must the drive voltage be when the device is lit up. Thus, where the discharge channel is long, an additional electrode may be provided intermediately between the related two electrodes or there may be provided a plurality of shorter serpentine channels instead of the single discharge channel. The expression "serpentine" here is meant to include a single "U" shape as well. It is important that the gap between the facing surfaces of the two transparent glass plates 21 and 22, that is, the surfaces excepting the portions forming the discharge channel, should not be larger than 0.2 mm and the most desirable is that they are substantially in contact with each other. If the gap becomes 0.3 mm or larger, the glass plates tend to be broken in the course of the exhausting process thereby lowering the production yield rate as shown in FIG. 11. Also, if the gap is larger than 0.2 mm, a bypassing discharge through the gap tends to develop thereby greatly deteriorating the brightness distribution. In this connection, if the width "d" of the facing portions (between turns of the serpentine discharge channel as shown in FIG. 10) is made larger than about 10 mm, the bypassing discharge can be suppressed.

Figure 12B:
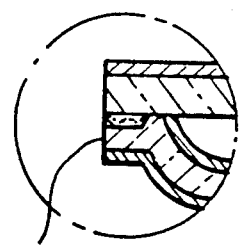
FIG. 12B is a closeup view showing a portion of the flat type fluorescent lamp of FIG. 12A.
Figure 12A:
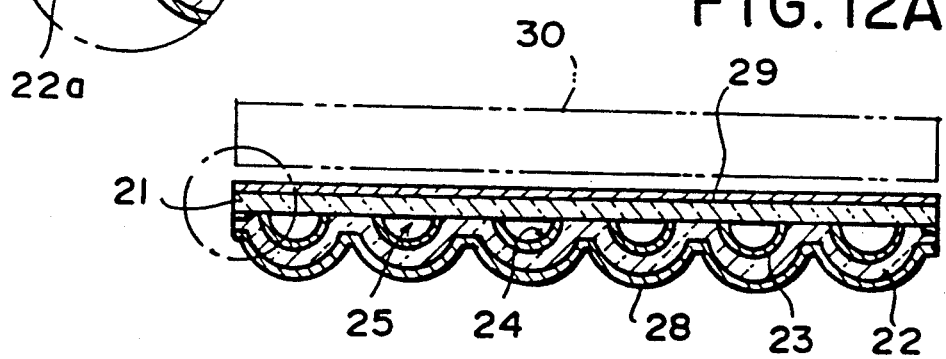
FIG. 12A is a sectional view showing a flat type fluorescent lamp lighting device of a second embodiment according to the invention.

In order to make the gap between the facing surfaces described above as small as possible, one effective way is, as shown in FIG. 12A as a second embodiment of the invention, to provide a free inlet 22a around the periphery of the transparent glass plate 22, so that this free inlet 22a is filled by the solder glass (or solder glass) for sealing the two glass plates 21, 22. As examples, the width and the depth of the free inlet may be 3 mm and 0.15 mm, respectively.

In the flat type fluorescent lamp lighting device as arranged above, a voltage is applied between the pair of electrode leads 26, 26 and the discharge develops within the discharge channel 25 formed between the two transparent glass plates 21, 22 thereby causing the fluorescent film 24 to glow. The light is caused to be defused by the defuse plate 29 at the front luminous side surface of the glass plate 21 and transmitted therethrough. A part of the light is reflected at the reflecting layer 28 at the non-luminous back surface of the transparent glass plate 22 and, thereupon, is transmitted through the mask 29, so that the light radiates outwardly in uniform distribution from the luminous front side surface of the transparent glass plate 21 so as to illuminate the liquid crystal display panel 30.

Next, a third embodiment of the invention is explained with reference to FIG. 13 and a fourth embodiment which is a modification of the third embodiment is explained with reference to FIG. 14. For the same or like elements as in FIGS. 9 and 10, the same or the like numerals are assigned and no explanation is repeated herein. The point different herein from the flat type fluorescent lamp lighting device of the first embodiment resides in the configuration of the discharge channel 25 provided between the two transparent glass plates 21, 22.

Figure 13:
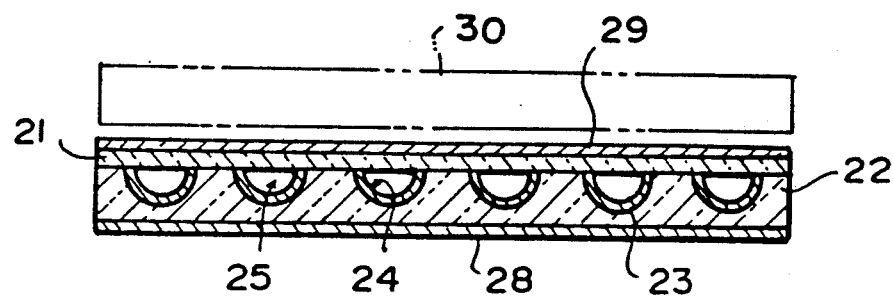
FIG. 13 is a sectional view showing a flat type fluorescent lamp lighting device of a third embodiment according to the invention.

That is, in the device of the third embodiment, the groove 23 as seen in FIG. 13 is formed by a molding process or an etching process on the facing surface of one of the transparent glass plates 21, 22, the inner surface of the groove 23 is coated by the fluorescent film 24, and the discharge channel 25 is formed by having the other transparent glass plate 21 airtightly fixed on the transparent glass plate 22.

Figure 14:
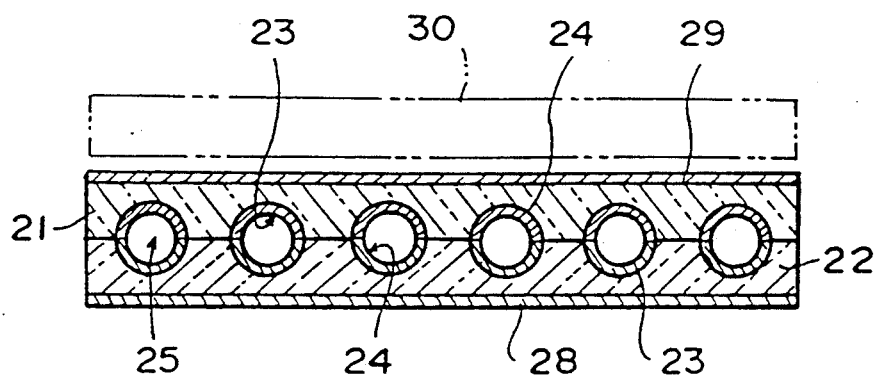
FIG. 14 is a sectional view showing a flat type fluorescent lamp lighting device of a fourth embodiment according to the invention.

In the modified device shown in FIG. 14, in addition to the groove and the fluorescent film on the facing surface of one transparent glass plate 22, there is also formed on the other transparent plate 21 through a metal molding or etching process a groove 23 which corresponds to the groove on the one transparent glass plate 22 and a fluorescent film 24 is provided on the inner surface of the groove. The discharge channel 25 substantially in a circle form in the cross section is formed between the two transparent glass plates sealed together.

Next, the result of the measurement of light distribution obtained from the flat type fluorescent lamp lighting device is explained. The device tested is one shown in FIG. 10 which has a discharge channel in a "W" shape and in a serpentine form and in which a third electrode is provided intermediately between the two cold cathode electrodes. The discharge channel is with its length of 700 mm and the groove 23 is with its width of 10 mm and its depth of 2 mm. The fluorescent film 24 is constituted by three-wavelength fluorescent substance for normal fluorescent lamp. The gas filled-in is Argon (Ar) and Mercury-vapor (Hg). The result of the measurement of the brightness on the luminous side glass plate (or on the diffuse plate) with the lighting under the sine wave at the frequency of 30 kHz and the input power of 3 watts is as shown in the following TABLE 1. The maximum brightness is that obtained at the portion where the discharge channel exists and the minimum brightness is that obtained at the portion where no discharge channel exists.

TABLE 1

| BRIGHTNESS (MAX/MIN) AND RATIO | | | | Unit: $cd/m^2$ |
|---|---|---|---|---|
| | | P1 ($\mu$m) | | |
| | | 0 | 0 | 20 | 50 |
| | | | P2 ($\mu$m) | | |
| R | D | 40 | 15 | 15 | 15 |
| No | No | 1080/25 (43:1) | 1180/20 (59:1) | 1950/20 (98:1) | 898/20 (45:1) |
| Yes | No | 1080/40 (27:1) | 1437/50 (29:1) | 2360/100 (24:1) | 1037/171 (6:1) |
| Yes | Yes | 440/72 (6:1) | 580/100 (6:1) | 1270/270 (5:1) | 764/467 (1.6:1) |

D: Light transmission uniformity means (translucent acrylic resin plate (1 mm in thick))
R: Reflecting means ($TiO_2$ film)
P1: Thickness of fluorescent film on luminous side glass plate
P2: Thickness of fluorescent film on back side glass plate
Given in parentheses () are brightness ratios.

The above TABLE 1 shows various advantages as follows:

(1) Where the light transmission uniformity means and the reflecting means are provided, the brightness distribution is improved to a large extent.

(2) Where the fluorescent film is provided not only on the back side glass plate but also on the luminous side glass plate, the brightness distribution is further improved.

(3) Where the thickness of the fluorescent film at the luminous side is larger, the brightness distribution is improved.

The reflection by the fluorescent film provided on the luminous side glass plate is important for the improvement of the brightness distribution. It is better if the fluorescent film is fairly thick and, as is seen in TABLE 1, the thickness of, for example, 20 $\mu$m is better than 50 $\mu$m.

Also, the balance between the amount of light emission and the amount of light transmission by the fluorescent film provided on the back side glass plate is important for improving the brightness distribution. The brightness distribution is improved by the reflecting means which is provided at the back surface of the back side glass plate and by which the light transmitted through the fluorescent film is reflected. It is desirable for the fluorescent film provided on the back side glass plate to transmit about half the emitted light and have the thickness of, for example, 15 $\mu$m.

Next, an embodiment of the invention relating to a method of lighting the flat type fluorescent lamp is explained with reference to FIGS. 15 and 17. The explanation is made on examples wherein, as has been the case with the prior art explained, the lighting is used for backlighting of liquid crystal display panels.

Figure 15:
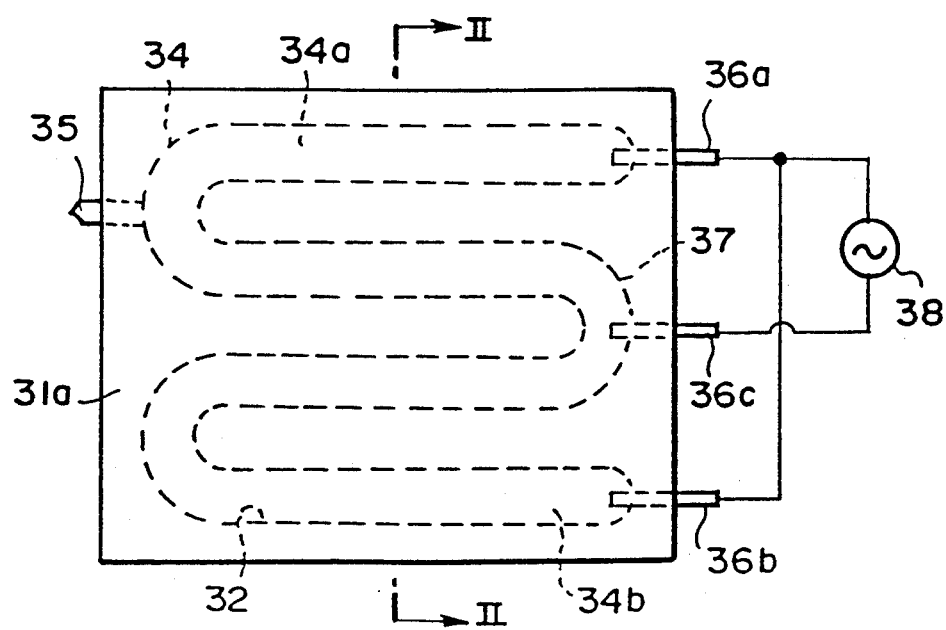
FIG. 15 is a plan view of a device for explaining a method of lighting as a fifth embodiment according to the invention.
Figure 16:
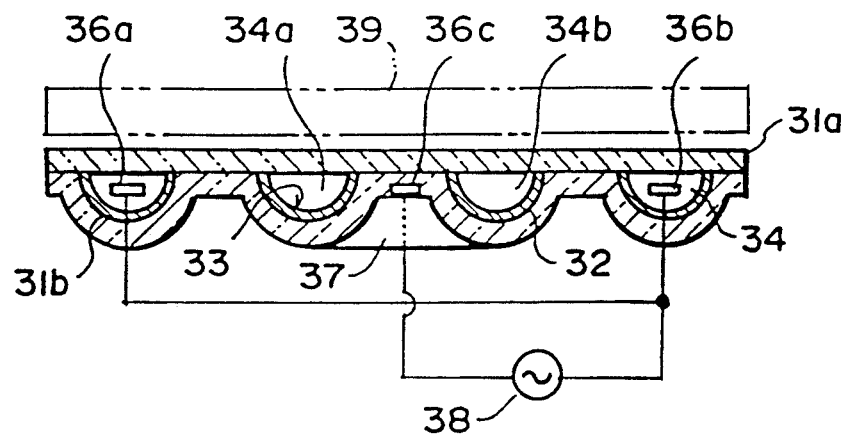
FIG. 16 is a sectional view showing the device in cross section along the line II—II in FIG. 15.

In the backlighting device of the fifth embodiment shown in FIGS. 15 and 16, the two transparent glass plates 31a and 31b are placed one over the other and sealed by solder glass at the periphery thereof. A groove 32 is formed by a forming process on the facing surface of one glass plate 31b. On the inner surface of the groove 32 is provided a fluorescent film 33. The groove 32 forms a discharge channel 34 which may be, for example, in a "W" shape in a serpentine form. After the air having been exhausted from the exhaust pipe 35, the discharge channel 34 is filled with mercury-vapor and inert gas such as argon and, thereafter, the tip of the exhaust pipe 35 is sealed off. Both the ends of the discharge channel 34 have a pair of electrode leads 36a, 36b one electrode at each end, which may either be of cold cathode type or thermal cathode type. An electrode lead 36c of either cold cathode type or thermal cathode is also provided at a bent portion 37 located at a middled point of the discharge channel 34. In this way, the discharge channel 34 is divided into a plurality (two in the drawings) of individual discharge channels 34a, 34b and all of these individual discharge channels have the electric characteristics of equivalent value. That is, the electric characteristics of each of individual discharge channel are determined by such characteristics as the distance between the two related electrodes, the diameter of the channel, the shape of the channel in cross section, the area in cross section and the electron emitting capacity of the electrodes, and also such factors as the composition and the pressure of the gas within the channel. The plurality of the channels 34a, 34b are so set that, by the appropriate combination of the above factors, the impedances between the electrodes are the same value. For example, where the diameters of respective channels are different, other characteristics such as the distance between the electrodes may be changed so that the equivalent electric characteristics could be set to be the same value in all the discharge channels. In the three electrode leads 36a-36c, the electrode leads 36a and 36b of the odd numbered parts at both the ends of the discharge channel 34 are shorted together and a single power source 38 is connected between these electrodes 36a, 36b and the electrode lead 36c in the even numbered part at the bent portion 37 of the discharge channel 34. Although not shown in the drawings, a reflecting film is formed on the non-luminous side glass plate 31b in which the groove 32 is formed and a diffuse film is formed on the luminous side glass plate 31a. Here, the reflecting film and the diffuse film are formed integrally on the glass plates 31a and 31b, respectively, but it may be arranged that, instead of the reflecting film and the diffuse film, a thin reflecting plate and a thin diffuse plate be placed respectively at the front of the glass plate 31b and at the back of the glass plate 31a.

In the backlighting device arranged as above, a high frequency voltage is applied by a single power source 38 between the connected electrode leads 36a, 36b at both ends and the electrode lead 36c at the bent portion 37 of the discharge channel 34, whereby the discharge takes place in the discharge channel 34 and the fluorescent film 33 on the inner surface of the groove 34 glows and the light radiated outwardly from the glass plate 31a causes the liquid crystal display panel 39 on the glass plate 31a to be illuminated. It is desirable for the high frequency voltage applied between the electrodes 36a, 36b and 36c to be set, for example, to the frequency of 20 kHz-70 kHz. If the frequency is lower than 20 kHz, a transformer used in drive circuitry needs to be made large, thereby presenting problems in making the device compact, and the lighting intensity states among the discharge channels tend to be unbalanced. Also, if the frequency is higher than about 70 kHz, although it is advantageous for making the device compact, the discharge state is greatly influenced and the luminosity deteriorates thereby largely lowering the lighting efficiency. In the state in which the high frequency voltage is applied by the single power source 38, the electric characteristics due to the above explained factors are equivalent in value in the individual discharge channels 34a, 34b formed by being divided by the electrode lead 36c at the bent portion 37 of the discharge channel 34. Thus, it is possible to ensure that all the individual discharge channels 34a, 34b are lit in parallel and simultaneously at the same level and it is possible to obtain the desired uniform luminosity distribution. In the backlighting device thus arranged, since the distance between the electrodes in each discharge channel after the division is shorter than before the division (by approximately ½ in the example shown in FIG. 15), it is possible to reduce the discharge starting voltage, the possibility of the electrodes being damaged, and the cost of the power source unit. Assuming that the discharge starting voltage of each discharge channel after the division may sufficiently be of the same level as that before the division, it is possible to make the distance between the electrodes long (to twice that shown in the example in FIG. 15) and, if the sizes of the glass plates 31a, 31b are not changed, it is possible to realize the backlighting device in which the number of turns in the serpentine form therein is increased proportionately to the increase thus made in the length of the discharge channel. If the number of turns in the serpentine form is to remain the same, it is possible to increase the sizes of the glass plates 31a, 31b proportionately to the increase in the length of the discharge channel, thereby enabling to realize a backlighting display of a larger area.

In the fifth embodiment of the invention explained above, the single electrode lead 36c is provided at the bent portion 37 located substantially at a middle point of the discharge channel 34 for dividing the discharge channel 34 into two channels, namely, the discharge channels 34a and 34b. However, the present invention is of course not limited to the above since, for example, the backlighting as according to the sixth embodiment shown in FIG. 17 is possible. For the sixth embodiment, the same or like elements as in the fifth embodiment shown in FIGS. 15 and 16 are assigned the same numerals and the relevant explanation is not repeated here.

Figure 17:
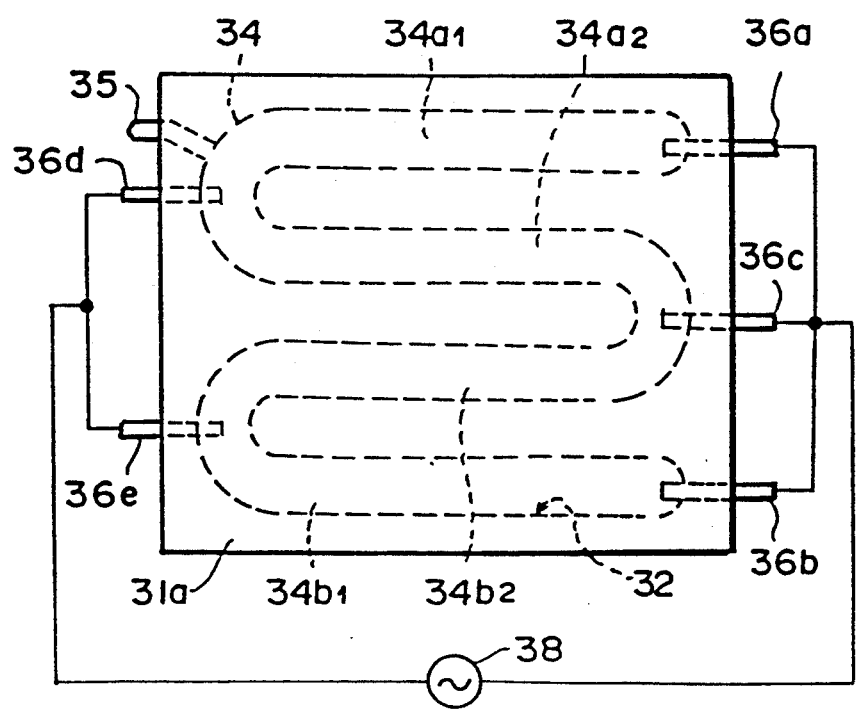
FIG. 17 is a plan view of a device for explaining a method of lighting as a sixth embodiment according to the invention.

In the backlighting device of the sixth embodiment shown in FIG. 17, one electrode each of the paired electrode leads 36a, 36b is sealed at each end of the serpentine discharge channel 34 and each of the electrode leads 36c-36e is sealed at each of the bent portions 37 of the discharge channel 34 so that the discharge channel 34 is divided into a plurality (four in the example shown in FIG. 17) of discharge channels 34a1, 34a2, 34b1, 34b2 all having the same or equivalent value in electric characteristics. In the backlighting device thus arranged, since the discharge channel is divided twice more than in the fifth embodiment, the distance between the electrodes is made much shorter (about ¼ in the example of FIG. 17), so that the discharge starting voltage can be further reduced. Also, if the same discharge starting voltage as in the prior art is sufficient, the distance between the electrodes can be further extended (four times in the example of FIG. 17), so that it is possible to realize a backlighting device with a long discharge channel which provides uniform brightness.

With respect to the embodiments of the invention for a method of backlighting, the explanation has been made on a flat type fluorescent lamp device but the invention is not limited only to the flat type since the lamp may well be constituted by an elongated straight pipe or a pipe in the shape of a "U" or "W".

Also, although the explanation of the invention has been made on embodiments relating to liquid crystal display panels, the invention is of course not limited thereto since it can be embodied in other light sources.

The flat type fluorescent lamp device according to the present invention has a configuration in which the two transparent glass plates are assembled and sealed together and the discharge channel in the form of a groove is formed in a serpentine form between the two transparent glass plates. The invention provides a light and compact flat type fluorescent lamp device having uniform light distribution and, even where the light transmission uniformity means and the reflecting means are provided respectively at the front and the back of the glass plate assembly, the device is light and compact and the device is particularly suited to and has practical value in the application to the backlighting of liquid crystal display panels used in portable devices or equipment.

In the flat type fluorescent lamp lighting device and with the method of lighting according to the invention, the divided individual discharge channels can be lit simultaneously at the same level by the single light source without the need of raising the discharge starting voltage whereby a uniform luminosity distribution can be obtained. Further, the lighting device provided is one which is light and compact and in which any possible damage to the electrodes can be reduced, the cost of the power source can be reduced, and a longer operating life of the device is ensured and the method provided is one by which the discharge lamp is enabled to be lit efficiently through a simple circuit configuration.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A flat type fluorescent lamp device comprising:
   a pair of transparent glass plates assembled and sealed together by solder glass around a peripheral portion thereof with a gap therebetween being not larger than 0.2 mm;
   a groove formed on a facing surface of at least one of said transparent glass plates;
   a discharge channel formed, in a serpentine form and with a width between adjacent turns of the serpentine discharge channel being not smaller than 10 mm, by said groove and having on its inner surface a fluorescent film; and a pair of electrode leads, one electrode lead provided at each end of said discharge channel.

2. A flat type fluorescent lamp device according to claim 1, wherein at least one of said two transparent glass plates has around its periphery a free inlet for being fillet with solder glass for airtightly sealing said two transparent glass plates.

3. A flat type fluorescent lamp device according to claim 2, in which:

at least another electrode lead is provided between said pair of electrode leads sealed respectively at two ends of the serpentine discharge channel, for dividing said discharge channel into a plurality of individual discharge channels physically connected in series, all of said individual discharge channels having the same value in electric characteristics.

4. A flat type fluorescent lamp device according to claim 3, which further comprises:

a uniform light distribution means provided on a luminous front side surface of said glass plate assembly; and a light reflecting means provided on a non-luminous back side surface of said glass plate assembly, said fluorescent film is formed on an inner surface of said discharge channel between said two transparent glass plates, said fluorescent film formed on the luminous side transparent glass having a larger thickness than that of said fluorescent film formed on the non-luminous side transparent glass.

5. A flat type fluorescent lamp device according to claim 1, which further comprises:

a uniform light distribution means provided on a luminous front side surface of said glass plate assembly; and a light reflecting means provided on a non-luminous back side surface of said glass plate assembly, said fluorescent film is formed on an inner surface or said discharge channel between said two transparent glass plates, said fluorescent film formed on the luminous side transparent glass having a larger thickness than that of said fluorescent film formed on the non-luminous side transparent glass.

6. A flat type fluorescent lamp device comprising:

a pair of transparent glass plates assembled and sealed together thereby forming a glass plate assembly;

a groove formed on a facing surface of at least one of said transparent glass plates;

a discharge channel formed, in a serpentine form, by said groove and having a fluorescent film on its inner surface;

a pair of electrode leads, one electrode lead provided at each end of said discharge channel;

a uniform light distribution means provided on a luminous front side surface of said glass plate assembly; and a light reflecting means provided on a non-luminous back side surface of said glass plate assembly.

7. A flat type fluorescent lamp device according to claim 6, wherein said fluorescent film is formed on an inner surface of said discharge channel between said two transparent glass plates, said fluorescent film formed on the luminous side transparent glass having a larger thickness than that of said fluorescent film formed on the nonluminous side transparent glass.

8. A method of lighting a fluorescent lamp comprising steps of:

dividing a serpentine discharge channel into a plurality of individual discharge channels by a plurality of electrodes which includes two electrodes at both ends of the serpentine discharge channel;

connecting together odd numbered electrodes among the plurality of electrodes;

connecting together even numbered electrodes among the plurality of electrodes; and applying a high frequency voltage of 20 kHz to 70 kHz by directly connecting a single power source between said connected odd numbered electrodes and said connected even numbered electrodes, wherein all of the individual discharge channels can be lit in parallel and with the same voltage at the same time.

9. A flat type fluorescent assembly connectable to a first and second terminal of a single power source, the flat type fluorescent assembly comprising:

a serpentine discharge channel;

a pair of electrodes leads, one electrode lead provided at each end of the discharge channel, and each of the respective electrode leads being directly connected to each other and coupled to the first terminal, the pair of electrode leads having the same voltage at the same time; and at least another electrode lead, coupled to the discharge channel between said pair of electrode leads, for dividing said discharge channel into a plurality of individual discharge channels, the impedance of each individual discharge channel being substantially equal, and the at least another electrode being coupled to the second terminal, the single power source being connected in parallel across all of the individual discharge channels.

* * * * *

UNITED STATES PATENT AND TRADEMARK OFFICE
CERTIFICATE OF CORRECTION

PATENT NO. : 5,220,249

DATED : June 15, 1993

INVENTOR(S) : Yoshiyuki Tsukada

It is certified that error appears in the above-identified patent and that said Letters Patent is hereby corrected as shown below:

Claim 5, col. 11, line 43, change "or" to --of--.

Claim 9, col. 12, line 39, change "electrodes" to --electrode--.

Signed and Sealed this

First Day of February, 1994

Attest:

BRUCE LEHMAN

Attesting Officer    Commissioner of Patents and Trademarks